United States Patent [19]

Paquet

[11] Patent Number: 5,447,350
[45] Date of Patent: Sep. 5, 1995

[54] SLIDER FOR CONNECTING CHOKER ROPE TO WINCHLINE

[76] Inventor: Roger Paquet, 244, rue Principale, St-Thomas-Didyme, Québec, Canada, G0W 1P0

[21] Appl. No.: 231,085

[22] Filed: Apr. 22, 1994

[51] Int. Cl.$^6$ ............................ B66C 1/14; F16G 11/14
[52] U.S. Cl. ...................................... 294/74; 294/82.14
[58] Field of Search ............... 294/74, 82.1, 82.11, 294/82.14, 90, 91; 24/115 R; 59/93, 95; 403/164, 165, 301, 353

[56] References Cited

U.S. PATENT DOCUMENTS

| | | | |
|---|---|---|---|
| 1,574,372 | 2/1926 | Dameron et al. | 294/82.14 |
| 1,643,362 | 9/1927 | Ashdown | 294/74 |
| 1,720,069 | 7/1929 | Yeaton . | |
| 2,135,994 | 11/1938 | Wirkkala . | |
| 2,233,083 | 2/1941 | MacKenzie . | |
| 2,490,218 | 12/1949 | Kirby et al. . | |
| 2,537,326 | 1/1951 | Brawand . | |
| 2,759,234 | 8/1956 | Brawand . | |
| 3,175,264 | 3/1965 | Maras | 294/82.14 |
| 3,237,259 | 3/1966 | Maras . | |
| 3,464,093 | 9/1969 | Laharty | 294/82.14 X |
| 3,870,357 | 3/1975 | Wernsing | 294/74 |
| 4,055,365 | 10/1977 | Kucherry . | |
| 4,188,141 | 2/1980 | Stoot . | |
| 4,653,792 | 3/1987 | Sword . | |

FOREIGN PATENT DOCUMENTS 284319 10/1928 Canada .

*Primary Examiner*—Johnny D. Cherry
*Attorney, Agent, or Firm*—Edwin E. Greigg; Ronald E. Greigg

[57] ABSTRACT

A slider is provided for connecting a choker assembly including a choker rope having an end provided with a ferrule, to a winchline. The slider has a first winchline-receiving link in the form of a first elongated closed loop defining a first elongated opening for receiving the winchline. The first link also has a longitudinal axis and a pair of opposite ends on the axis, one of the ends is substantially larger in section than the other one and has a curved bottom wall. This first link also has top and bottom surfaces, and a substantially trapezoidal configuration when seen in side elevational view. The slider also has a second choker-rope receiving link in the form of a second elongated loop defining a second opening. This second link is provided with a longitudinal U-shaped slot leading from the second opening out of the second link through an end thereof. This U-shaped slot is sized for receiving the choker rope and has a first extremity within the second opening which defines a seat for the ferrule. The U-shaped slot has opposite side walls sized and shaped to prevent angular displacement of the choker rope within the slot with respect to the ferrule. The walls have edges that are slightly rounded and apertures for receiving a ferrule locking pin to prevent the ferrule from exiting the second link. The slider further has a third connection link in the form of a third closed loop defining a third opening. This third link passes through the first and second openings and connects the first and second links together. When the slider is used, it is able to conform to any bearing surface while preventing overbending of the choker rope adjacent to the ferrule.

3 Claims, 4 Drawing Sheets

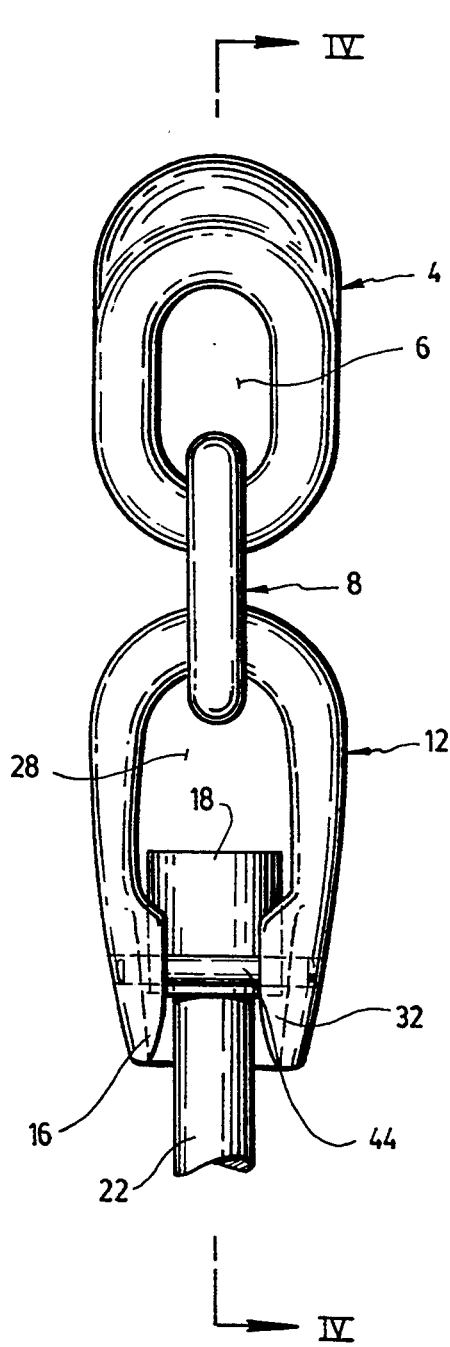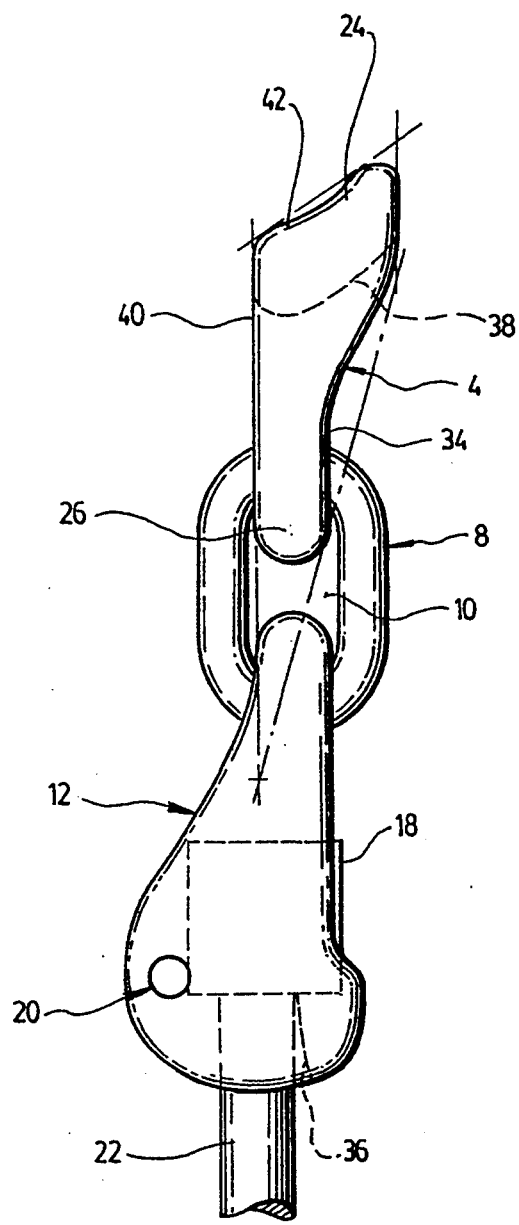
FIG. 2
FIG. 3

SLIDER FOR CONNECTING CHOKER ROPE TO WINCHLINE

BACKGROUND OF THE INVENTION a) Field of the Invention

The present invention relates to an improved slider for connecting a choker assembly including a choker rope, to a winchline, and more particularly to a logging winchline.

b) Brief Description of the Prior Art

Known in the art, there is U.S. Pat. No. 2,537,326 granted on Jan. 9, 1951 to F. M. BRAWAND. This patent describes a log arch hook comprising a plurality of parallel crossbars. Each of the crossbars has at least one socket therein opening toward an adjacent crossbar and a slot extending through the side wall and part of the bottom of the socket. Also, the log arch hook comprises a plurality of chain links each connecting a corner of one crossbar to the adjacent corner of the next crossbar. Those chain links are lying in planes normal to the crossbars and project beyond the front and rear surfaces thereof. In operation, the crossbars are maintained above a supporting surface by the outer peripheries of the chain links.

Also known in the art, there is U.S. Pat. No. 2,490,218 granted on Dec. 6, 1949 to W. B. KIRBY et al. This patent describes a butt hook and link assembly for use on a hauling cable having a ferrule secured to one end. This butt hook and link assembly comprises, an integrally formed butt hook that includes side portions and is configured to define a longitudinally elongated closed loop with a ferrule socket at one end thereof. The butt hook also has therein a longitudinal slot adjoining and extending along one side of the ferrule socket. This ferrule socket is partially open on the side of the socket opposite the slot and adjacent the loop for the passage of the ferrule into and from the socket. The slot is of a transverse width less than that of the ferrule and large enough to let the cable pass. The butt hook also comprises an elongated closed link extending through the closed loop of the butt hook.

Further known in the art, there are the following patents which describe different butt hooks or choker assemblies:

Canadian patents nos.: 265,391 of N. A. DAMERON and R. RHODES, granted on Nov. 2, 1926; 284,319 of J. F. DRAPER, granted on Oct. 30, 1928;

U.S. Pat. Nos.: 1,720,069 of G. A. YEATON, granted on Jul. 9, 1929; 2,135,994 of O. A. WIRKKALA, granted on Nov. 8, 1938; 2,233,083 of D.G. M$^{ac}$ KENZIE, granted on Feb. 25, 1941; 2,759,234 of F. M. BRAWAND, granted on Aug. 21, 1956; 3,237,259 of P. J. MARAS, granted on Mar. 1, 1966; 4,055,365 of J. D. KUCHERRY, granted on Oct. 25, 1977; 4,188,141 of R. C. STOOT, granted on Feb. 12, 1980; 4,653,792 of A. F. SWORD, granted on Mar. 31, 1987;

One drawback with the butt hooks or choker assemblies described in the above mentioned patents, is that they do not provide a slider of simple structure for connecting to a winchline, a choker assembly including a choker rope provided with a ferrule. More particularly, they do not provide a slider of simple structure which can easily conform to the bearing surface of a hauling equipment, and that while preventing overbending of the choker rope.

Another drawback of the existing sliders for connecting choker assemblies to a winchline is that they cut the winchline while conforming to a hauling drum. Because of such a cutting, the winchline's knot has to be replaced approximately 2 to 4 times a day.

A further drawback of the existing sliders is that they cut the choker ropes of choker assemblies, and consequently the choker ropes have to be replaced approximately every week or two (during this time, one choker rope ferrule is used for approximately two or three days, and thereafter another choker rope ferrule is used for two or three days).

In this connection, it is worth noting that during hauling operations, the sliders rub against each other. Consequently, the choker rope ferrules are usually cut after only a few days and cannot be easily removed from the slider. Indeed, to remove the ferrule which is cut, the inside slider edges have to be ground down to allow the ferrule to exit. Moreover, the second ferrule can be mounted on the slider only when the extremity of the choker rope, which is about 2 inches long and stays in the slider when the choker is cut, has been removed.

Also, during long operations, the sliders stretch, thereby making it difficult to pass the ferrules through the openings of the sliders. Consequently, the sliders have to be replaced and thrown out.

Finally, the use of the existing sliders causes considerable time losses and premature cuts of the choker ropes near the ferrules.

OBJECTS AND SUMMARY OF THE INVENTION

It is therefore an object of the present invention to provide a slider for connecting a choker rope to a winchline, which is so devised that it can easily conform to the bearing surface of any kind of hauling equipment, whatever be the shape of this surface.

It is also an object of the present invention to provide a slider for connecting a choker rope to a winchline, which is devised to prevent an overbending of the choker rope, and thus to reduce the strain applied on it and on the ferrule used to connect it to the slider.

In accordance with the present invention, the above objects are achieved with a slider for connecting a choker assembly to a winchline. This choker assembly includes a choker rope having an end provided with a ferrule. Preferably, the choker rope is provided with only one ferrule at each end.

The slider comprises a first winchline-receiving link in the form of a first elongated closed loop defining a first elongated opening for receiving the winchline. The first link also has a longitudinal axis and a pair of opposite ends on the axis, one of the ends is substantially larger in section than the other one and has a curved bottom wall. This first link also has top and bottom surfaces, and a substantially trapezoidal configuration when seen in side elevational view. The trapezoidal configuration has the bottom surface as a first base which is adjacent to said pair of opposite ends, and the top surface as a second base which is adjacent to the end which is larger in section and extends therefrom to a predetermined distance of the same.

The slider also comprises a second choker-rope receiving link in the form of a second elongated loop defining a second opening. This second link is provided with a longitudinal U-shaped slot leading from the second opening out of the second link through an end thereof. This U-shaped slot is sized for receiving the choker rope and has a first extremity within the second opening which defines a seat for the ferrule. The U-shaped slot has opposite side walls sized and shaped to prevent angular displacement of the choker rope within the slot with respect to the ferrule. At least one of the walls has an aperture for receiving a ferrule locking pin to prevent the ferrule from exiting the second link. The two opposite side walls and a bottom wall of the U-shaped slot have edges that are slightly rounded. These rounded edges prevent premature cuts of the choker ropes.

The slider also comprises a third connection link in the form of a third closed loop defining a third opening. This third link passes through the first and second openings and connects the first and second links together.

In operation, the slider is able to conform to any bearing surface while preventing overbending of the choker rope adjacent to the ferrule.

In accordance with the present invention, there is also provided a combination including a winchline, at least one choker rope having an end provided with a ferrule, and at least one slider as described hereinabove, for connecting each choker rope to the winchline.

BRIEF DESCRIPTION OF THE DRAWINGS

In order to impart full understanding of the manner in which the above and other objects of the invention are achieved, a non-restrictive description of a preferred embodiment thereof will be given hereinafter, with reference to the accompanying drawings, wherein:

FIG. 2 is a front elevational view of the slider of FIG. 1, showing the assembled relationship of a choker rope therewith.

FIG. 3 is a side elevational view of the slider of FIG. 1, showing the assembled relationship of a choker rope therewith.

DESCRIPTION OF A PREFERRED EMBODIMENT

Figure 5:
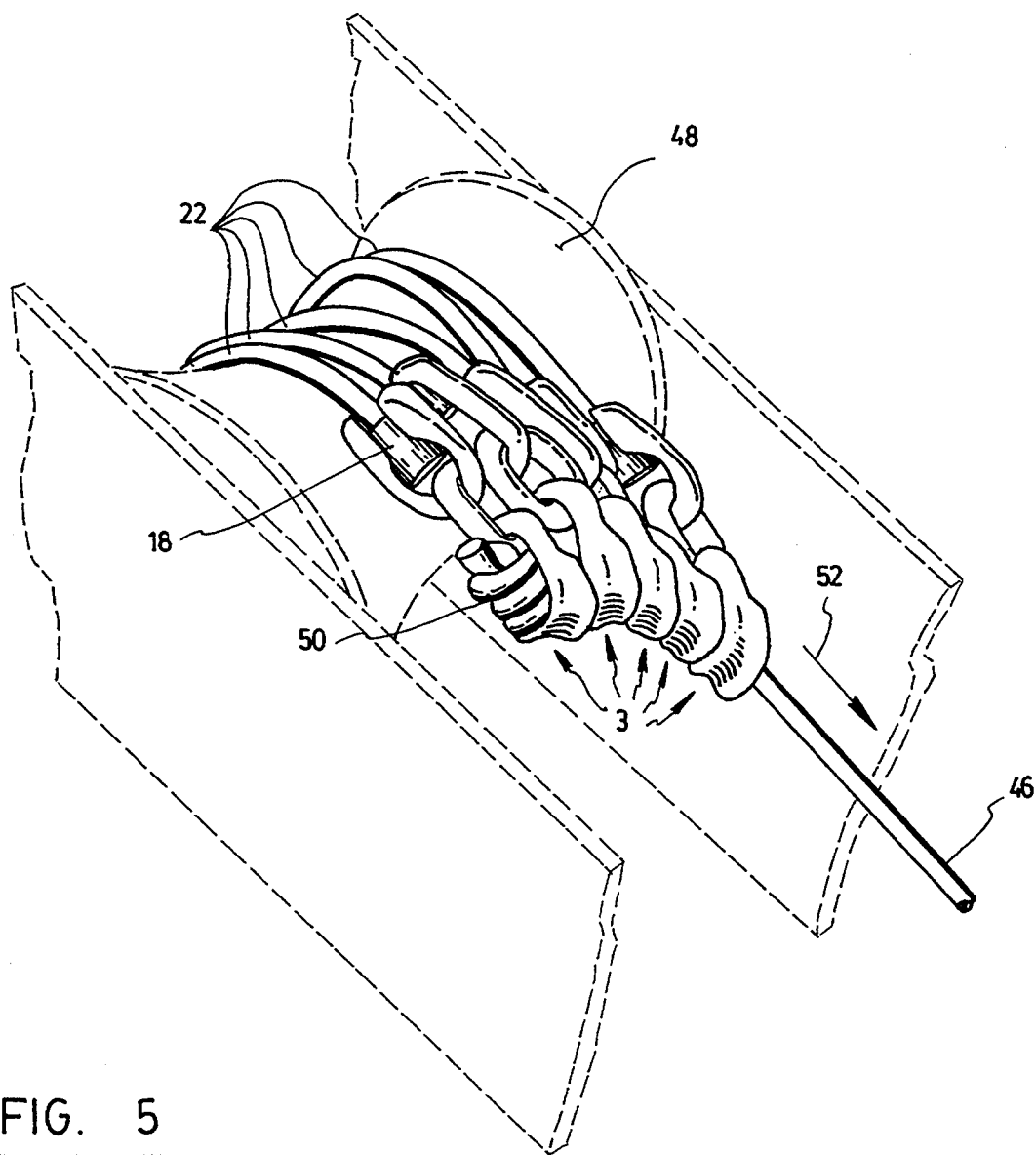
FIG. 5 is a perspective view of a plurality of sliders according to the present invention, mounted onto a single winchline and conforming to the surface of a hauling drum.

The slider according to the invention as shown in the accompanying drawings is intended to be used for connecting the end of a choker rope 22 provided with a ferrule 18 to a winchline 46 (shown in FIG. 5).

The slider 3 comprises a first winchline-receiving link 4 in the form of an elongated first closed loop defining a first elongated opening 6 for receiving the winchline 46. This link 4 has a top and a bottom surface, respectively numbered 34 and 40. This link 4 also has a pair of opposite ends 24 and 26. The end 24 is substantially larger in section than the end 26 and has a curved bottom wall 38.

As can be seen, the first link 4 has a nearly trapezoidal configuration. This trapezoidal configuration has a first base consisting of the bottom surface 40 of the link which is adjacent to the apex-shaped end 26 and to end 24, and a second base consisting of the top surface 34 which is only adjacent to the end 24.

Figure 1:
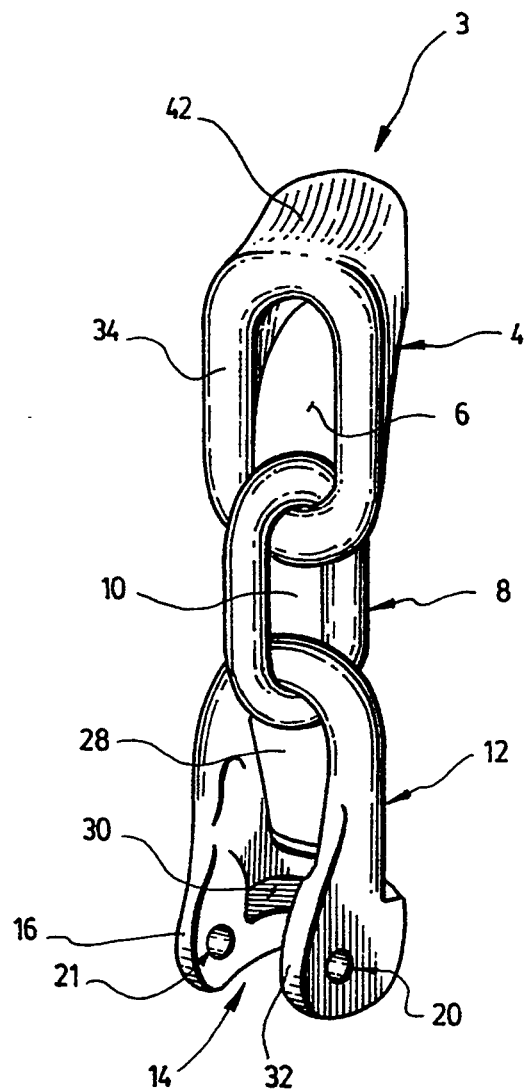
FIG. 1 is a perspective view of a slider according to the invention for connecting a choker rope to a winchline.
Figure 4:
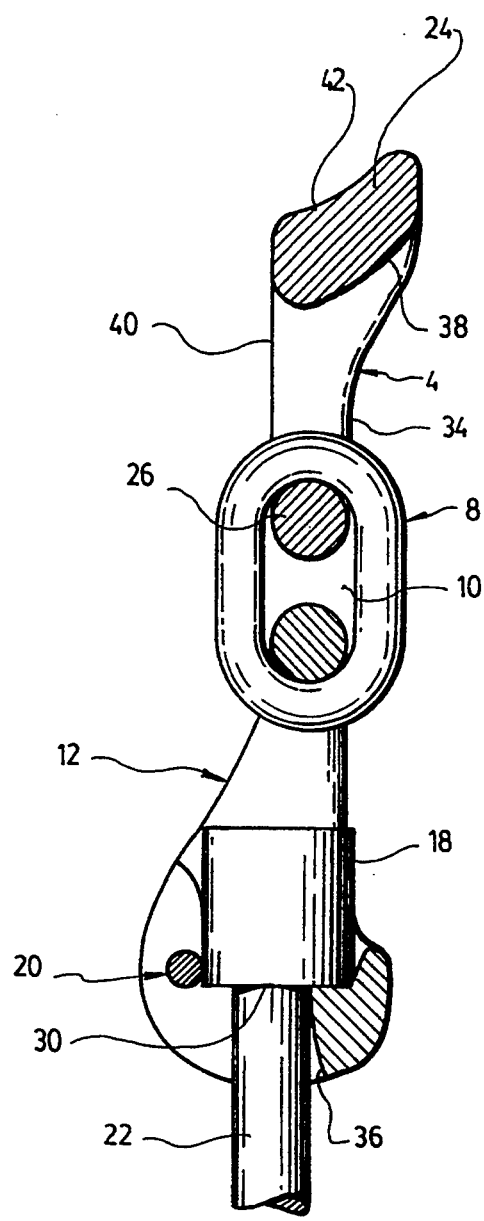
FIG. 4 is a cross sectional view of the slider and choker rope shown in FIG. 2, taken along line IV—IV.

The slider 3 also comprises a second choker-rope receiving link 12 in the form of a second elongated loop defining a second opening 28. The second link 12 is provided with a longitudinal U-shaped slot 14 leading from the second opening 28 out of the second link 12 through an end thereof. The slot 14 is sized for receiving the choker rope 22 and has a first extremity within the second opening 28 which defines a seat 30 for the ferrule 18. This seat 30 is clearly shown in FIG. 1. The U-shaped slot 14 also has opposite side walls 16 and 32, which are sized and shaped to prevent angular displacement of the choker rope 22 within the slot 14 with respect to the ferrule 18. These opposite side walls, 16 and 32, have edges that are slightly rounded. The U-shaped slot 14 further has a bottom wall 36 having edges that are slightly rounded. These rounded edges are very important to the slider 3, because they prevent premature cuts of the choker ropes. A first aperture 20 made through the wall 32 and a second aperture 21 made through wall 16 and aligned with the first aperture 20 are provided for receiving a ferrule locking pin 44 (shown in FIG. 2) in order to prevent the ferrule 18 from exiting the second link 12.

It is worth mentioning that one aperture only could be made through one of the walls 16 or 32, for receiving the aforesaid ferrule locking pin 44.

The slider 3 further comprises a third connection link 8 in the form of a third closed loop defining a third opening 10. The third connection link 8 passes through the first and second openings, respectively 6 and 28, and connects the first link 4 and the second link 12 together.

Preferably, the slider 3 can be used in logging operations. During those logging operations, a great number of larger and smaller logs have to be removed from their cutting sites. In that event, it is of common practice to use some choker ropes of the same length (14 or 16 feet) to wrap around several smaller logs and other choker ropes to wrap around larger logs. It is therefore very convenient to have a plurality of sliders slidably mounted onto a single winchline, each slider being connected to a corresponding choker rope of the same length.

In operation, as shown in FIG. 5, a plurality of sliders 3 are mounted onto the winchline 46 and kept thereon by means of a locking knot 50 made in the winchline. When the winchline 46 is pulled, each of the sliders 3 has its top surface 40 adjacent to the bottom surface 34 of each other slider. In that way, the sliders are able to orientate themselves with respect to the direction of pulling (shown with an arrow 52), and thus to reduce the strains on the winchline 46 and on the choker ropes 22. Thanks to their shape, the sliders 3 are also able to conform to a bearing surface of a hauling drum 48 while preventing overbending of the corresponding choker ropes 22 adjacent to the ferrules 18.

Preferably, the dimensions of the slider are as follows:
1) the first winchline-receiving link 4 may have a thickness of 0.63 inches and a width of 2.25 inches, its first elongated opening having a length of 2 inches and a width of 1 inch;
2) the second choker-rope receiving link 12 may have a thickness of 0.63 inches, the U-shaped slot 14 having a length of 0.75 inches, the separation between the edges of the two opposite walls, 16 and 32, being 0.63 inches and the aperture 20 having a diameter of 0.32 inches;
3) the third connection link 8 may have a thickness of 0.5 or 0.6 inches, a length of 2.5 inches and a width of 1.75 inches, the third opening 10 having a length of 1.5 inches and a width of 0.75 inches. It is important to point out that the third connection link 8 must have a thickness greater than 0.6 inches, so that, in operation, it is unable to change place with the winchline (if the winchline has the diameter of as low as 0.5 inches).

As can be appreciated, there are various advantages to the slider according to the invention. In addition to being of a simple construction and thus easily manufacturable from metal, preferably by casting, the slider according to the invention is extremely effective even when heavy loads are pulled. It also prevents a premature wear of a choker rope and of a winchline by reducing the strains thereon and by conforming to any bearing surface.

Furthermore, in use, the slider according to the invention does not cut the winchline on which it is mounted because of its ability to conform to a surface of a drum. Also, the slider does not cut the choker rope because its U-shaped slot and the two opposite side walls have rounded edges. Consequently, when the slider is being used, the winchline's knot does not have to be redone for more than one day.

Also, the choker ropes are not prematurely cut, because of the adaptability of the slider to each choker rope, and consequently, the last can be used for up to six weeks before it cuts near the ferrule. This adaptability is not found in the patents mentioned hereinbefore. Moreover, the aforementioned problem of rubbing between the sliders becomes non-existent.

It is of great importance to use choker ropes only having one ferrule at each extremity thereof. In that way, when the choker rope is worn near the first ferrule, one may switch the extremities and use the second ferrule for the same amount of time as the first.

It is worth mentioning that it is of common practice to mount a second ferrule on the choker rope at a close distance from the choker rope's ferruled end. In that event, the choker rope is cut in front of this second ferrule and has to be changed in a matter of only a few days.

Thus, the slider according to the present invention, in addition to eliminating time losses due to changing of the choker ropes, is particularly well designed to prevent premature cutting of the choker rope near its ferruled end.

Although the present invention has been explained hereinabove by way of a preferred embodiment thereof, it should be pointed out that any modifications to this preferred embodiment within the scope of the appended claims are not deemed to alter or change the nature and scope of the present invention.

The embodiments of the invention in which an exclusive property or privilege is claimed, are defined as follows:

1. A slider for connecting a choker assembly to a winchline, said choker assembly including a choker rope having an end provided with a ferrule, said slider comprising:

a first winchline-receiving link in the form of a first elongated closed loop defining a first elongated opening for receiving said winchline, said first link also having a longitudinal axis and a pair of opposite ends on said axis, one of said ends being substantially larger in section than the other one and having a curved bottom wall, said first link also having top and bottom surfaces, and a substantially trapezoidal configuration when seen in side elevational view, said trapezoidal configuration having a first base consisting of said bottom surface which is adjacent to said pair of opposite ends, and a second base consisting of said top surface which is adjacent to said end larger in section and extends therefrom to a predetermined distance away from the same;

a second choker-rope receiving link in the form of a second elongated loop defining a second opening, said second link being provided with a longitudinal U-shaped slot leading from said second opening out of said second link through an end thereof, said slot being sized for receiving said choker rope and having a first extremity within said second opening which defines a seat for said ferrule, said U-shaped slot also having a bottom wall and two opposite side walls sized and shaped to prevent angular displacement of said choker rope within said slot with respect to said ferrule, at least one of said side walls having an aperture for receiving a ferrule locking pin to prevent said ferrule form exiting said second link, the bottom wall and the two opposite side walls of said U-shaped slot having edges that are slightly rounded; and a third connection link in the form of a third closed loop defining a third opening, said third link passing through said first and second openings and connecting said first and second links together, whereby, in operation, said slider is able to conform to any bearing surface while preventing overbending of said choker rope adjacent to said ferrule.

2. In combination, (a) a winchline, (b) at least one choker rope having an end provided with a ferrule, and (c) at least one slider for connecting each of said at least one choker rope to said winchline, each of said at least one slider comprising:

a first winchline-receiving link in the form of a first elongated closed loop defining a first elongated opening for receiving said winchline, said first link also having a longitudinal axis and a pair of opposite ends on said axis, one of said ends being substantially larger in section than the other one and having a curved bottom wall, said first link also having top and bottom surfaces, and a substantially trapezoidal configuration when seen in side elevational view, said trapezoidal configuration having a first base consisting of said bottom surface which is adjacent to said pair of opposite ends, and a second base consisting of said top surface which is adjacent to said end larger in section end extends therefrom to a predetermined distance away from the same;

a second choker-rope receiving link in the form of a second elongated loop defining a second opening, said second link being provided with a longitudinal U-shaped slot leading from said second opening out of said second link through an end thereof, said slot being sized for receiving said choker rope and having a first extremity within said second opening which defines a seat for said ferrule, said U-shaped slot also having a bottom wall and two opposite side walls sized and shaped to prevent angular displacement of said choker rope within said slot with respect to said ferrule, at least one of said side walls having an aperture for receiving a ferrule locking pin to prevent said ferrule from exiting said second link, the bottom wall and the two opposite side walls of said U-shaped slot having edges that are slightly rounded; and a third connection link in the form of a third closed loop defining a third opening, said third link passing through said first and second openings and connecting said first and second links together.

3. The combination according to claim 2, wherein at least two sliders are slidably mounted onto said winchline and, each of said at least two sliders having its top surface adjacent to the bottom surface of each other slider when said winchline is pulled whereby, in operation, said at least two sliders are able to orientate themselves with respect to a direction of pulling, and thus reduce the strains on said winchline and on at least two choker ropes.

* * * * *